US011328226B2

United States Patent
Schlitt et al.

(10) Patent No.: US 11,328,226 B2
(45) Date of Patent: May 10, 2022

(54) DISPENSING CHEMISTRY TO A PROCESS CONTROL ASSET

(71) Applicant: Ecolab USA Inc., St. Paul, MN (US)

(72) Inventors: John A. Schlitt, Missouri City, TX (US); William R. Esposito, Warrenville, IL (US)

(73) Assignee: Ecolab USA Inc., Saint Paul, MN (US)

( * ) Notice: Subject to any disclaimer, the term of this patent is extended or adjusted under 35 U.S.C. 154(b) by 367 days.

(21) Appl. No.: 15/876,774

(22) Filed: Jan. 22, 2018

(65) Prior Publication Data

US 2018/0144271 A1 May 24, 2018

Related U.S. Application Data

(63) Continuation of application No. 13/764,447, filed on Feb. 11, 2013, now abandoned, which is a continuation of application No. PCT/US2011/055017, filed on Oct. 6, 2011, which is a continuation of application No. 12/899,250, filed on Oct. 6, 2010, now abandoned.

(51) Int. Cl.
*G06Q 10/00* (2012.01)
*G06F 16/22* (2019.01)
*G06Q 10/06* (2012.01)

(52) U.S. Cl.
CPC .............. *G06Q 10/00* (2013.01); *G06F 16/22* (2019.01); *G06Q 10/06312* (2013.01)

(58) Field of Classification Search
CPC ... G06Q 10/00; G06Q 10/06312; G06F 16/22
See application file for complete search history.

(56) References Cited

U.S. PATENT DOCUMENTS 5,252,524 A  10/1993 Borrelli et al.
5,326,482 A   7/1994 Lessard et al.
(Continued)

FOREIGN PATENT DOCUMENTS

CN  1896994 A    1/2007
CN  1936942 A *  3/2007  ............. G06Q 10/00
(Continued)

OTHER PUBLICATIONS

Adair, S., Asset Integrity Management In the Digital Age, Jan. 1, 2008, World Petroleum Congress, 19th World Petroleum Congress, Jun. 29-Jul. 3 Abstract. (Year: 2008).*
(Continued)

*Primary Examiner* — Tan D Nguyen
(74) *Attorney, Agent, or Firm* — Fredrikson & Byron, P.A.

(57) ABSTRACT

The invention provides a method of efficiently determining the effectiveness of managing a chemical or industrial facility. The method involves identifying various industrial site assets and recording various specs of those assets over time. The various assets are grouped according to some hierarchy such as location, problem to be solved, or just asset type. The specs are compared to acceptable ranges and are scored positively or negatively. The system allows a user to determine trends by asset type, spec type, or by position within the hierarchy. This system allows both small scale and large-scale perspective, and can be used for both reactive and preemptive decision making.

7 Claims, 2 Drawing Sheets

(56) References Cited

U.S. PATENT DOCUMENTS

| | | | |
|---|---|---|---|
| 5,799,286 A | 8/1998 | Joseph et al. | |
| 6,661,743 B1 | 12/2003 | Mafune et al. | |
| 6,957,153 B2* | 10/2005 | Esposito, Jr. | C01B 3/506 |
| | | | 702/138 |
| 7,233,910 B2 | 6/2007 | Hileman et al. | |
| 7,448,230 B2 | 11/2008 | Esposito et al. | |
| 7,550,060 B2 | 6/2009 | Jacobson et al. | |
| 2002/0069102 A1* | 6/2002 | Vellante | G06Q 10/06312 |
| | | | 705/7.22 |
| 2002/0108077 A1 | 8/2002 | Havekost et al. | |
| 2004/0098279 A1* | 5/2004 | Frazier | G06Q 10/10 |
| | | | 705/302 |
| 2005/0007249 A1* | 1/2005 | Eryurek | G05B 23/027 |
| | | | 340/511 |
| 2006/0174211 A1 | 8/2006 | Hoellerer et al. | |
| 2007/0043642 A1* | 2/2007 | Smith | G06Q 40/06 |
| | | | 705/36 R |
| 2008/0201181 A1 | 8/2008 | Hileman et al. | |
| 2008/0256430 A1* | 10/2008 | Gold | G06Q 10/00 |
| | | | 715/200 |
| 2009/0106080 A1* | 4/2009 | Carrier | G06Q 10/00 |
| | | | 705/7.32 |
| 2009/0149981 A1 | 6/2009 | Evans et al. | |
| 2010/0011342 A1 | 1/2010 | Bhattacharyya et al. | |
| 2010/0185557 A1* | 7/2010 | Hunter | G06Q 40/06 |
| | | | 705/36 R |

FOREIGN PATENT DOCUMENTS

| | | | | |
|---|---|---|---|---|
| WO | WO 2004114095 | * | 12/2004 | |
| WO | WO-2006094330 A1 | * | 9/2006 | G06Q 10/0637 |
| WO | WO-2009034415 A2 | * | 3/2009 | G06Q 10/0635 |

OTHER PUBLICATIONS

GoogleScholar NPL and Patent Search. (Year: 2021).*
McBarron, Martha, "The Implications to Industrial Sites of Risk and Hazard-Based Approaches to Managing Land Contamination", 2006, Symposium Series No. 151, pp. 1-17. (Year: 2006).*
Jutta Geldermann, "Multi-criteria decision support and evaluation of strategies for nuclear remediation management", 2006, The International Journal of Management Science, pp. 238-251. (Year: 2006).*
International Patent Application No. PCT/US2011/055017, International Search Report and Written Opinion dated Mar. 6, 2012, 6 pages.
European Patent Application No. 11831560.5, Extended European Search Report dated Mar. 12, 2014, 6 pages.

* cited by examiner

DISPENSING CHEMISTRY TO A PROCESS CONTROL ASSET

CROSS-REFERENCE TO RELATED APPLICATIONS

The present application is a continuation of U.S. patent application Ser. No. 13/764,447, filed Feb. 11, 2013, which claims the benefit of PCT Patent Application No. PCT/US2011/055017, filed Oct. 6, 2011, which claims the benefit of U.S. patent application Ser. No. 12/899,250, filed Oct. 6, 2010, each of which is incorporated herein by reference in its entirety.

STATEMENT REGARDING FEDERALLY SPONSORED RESEARCH OR DEVELOPMENT

Not Applicable.

BACKGROUND OF THE INVENTION

This invention relates generally to a system and method for the collection analysis and application of data in a chemical plant. Chemical and industrial facilities utilize a variety of complex equipment, which are often subject to harsh chemical and physical conditions. As such, a number of technologies have been developed to monitor the condition, efficiency, and expected lifespan of the equipment. Such technologies include historian systems, which collect and archive data from various sources within the chemical plant.

Monitoring equipment typically involves a system in which a variety of process variables are measured and recorded. One such system is described in US Published Patent Application 2009/0149981 A1. Such systems however often produce massive amounts of data of which only a small portion of which is usefully tracked to detect abnormal conditions and the information gleaned from those systems is of limited practical use.

Thus there is clear need and utility for system and method for the collection, analysis, and application of data in a chemical plant. The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 CFR § 1.56(a) exists.

BRIEF SUMMARY OF THE INVENTION

At least one embodiment of the invention is directed towards a method for efficiently observing the effectiveness of an industrial facility. The method comprises: inputting one or more specs from one or more data sources relating to the physical attributes of two or more assets into a computer, organizing the assets according to a hierarchy, and displaying the data in a format allowing the user to compare the specs by asset type, spec type, or position within the hierarchy.

The spec may be spec is selected from the list consisting of: pH, temperature, voltage, age, viscosity, density, weight, salinity, concentration of a particular composition of matter, or any combination thereof. The hierarchy may be selected from the list consisting of: asset category, geographic location, unit of ownership, time of operation, cost of operation, and any combination thereof. The method may further comprise the steps of: scoring at least one spec by determining if they fall within an acceptable range of values, aggregating at least some of the specs of at least one asset and determining if the aggregate spec falls within an acceptable range of values, providing an unequal weight to certain specs, and/or determining an overall rating by aggregating the specs of multiple assets.

The operation of at least one asset may involve at least two specs, altering the value of each spec directly causes a specific change in the cost of operating or maintaining the asset, and altering one spec mitigates the costs associated with altering another spec, wherein the method further comprises the step of displaying the associated costs of various possible alterations of one or more of the specs. The asset may be operated in accordance with the maintenance of the specs in conformance with the lowest possible cost combination. At least one asset may be selected from the list consisting of: boilers, heat exchangers, cooling towers, conduit pipes, crude oil refinery units, reaction vessels, mills, storage tanks, mixing tanks, pumps, valves, water treatment facilities, and any combination thereof.

The changes in the costs of operating or maintaining the asset may be the change in cost of an item selected from the list consisting of: energy, feedwater, industrial chemicals, scale control chemicals, corrosion mitigating chemicals, waste consuming microorganisms, time offline, repair costs, component replacement costs, lost sales, opportunity cost, and any combination thereof. The display may include the revenue to be earned from operating at least one asset according to the displayed specs.

The method may further comprise implementing at least two specs in at least one asset based on rationally selecting a desired ratio of costs to revenue. The implementation may be accomplished according to one item selected from the list consisting of: a manual human operation, an automated response by process control equipment receiving the data, and any combination thereof.

BRIEF DESCRIPTION OF THE DRAWINGS

A detailed description of the invention is hereafter described with specific reference being made to the drawings in which.

DETAILED DESCRIPTION OF THE INVENTION

In at least one embodiment, a chemical management system is provided which comprises at least one computer and at least one source of data, which is input into the computer. The data source comprises at least one source of raw data related to the item(s) under management selected from control systems output, wet chemistry test results, manual observation data, data collected by handheld equipment, laboratory management systems (LIMS), gauges, transmitters, statistical process control, statistical quality control, inventory management software, and any combination thereof. This information is stored by the computer and indexed by time. The data sources may also include information collected by a process historian such as but not limited to that described by US 2009/0149981.

Figure 1:
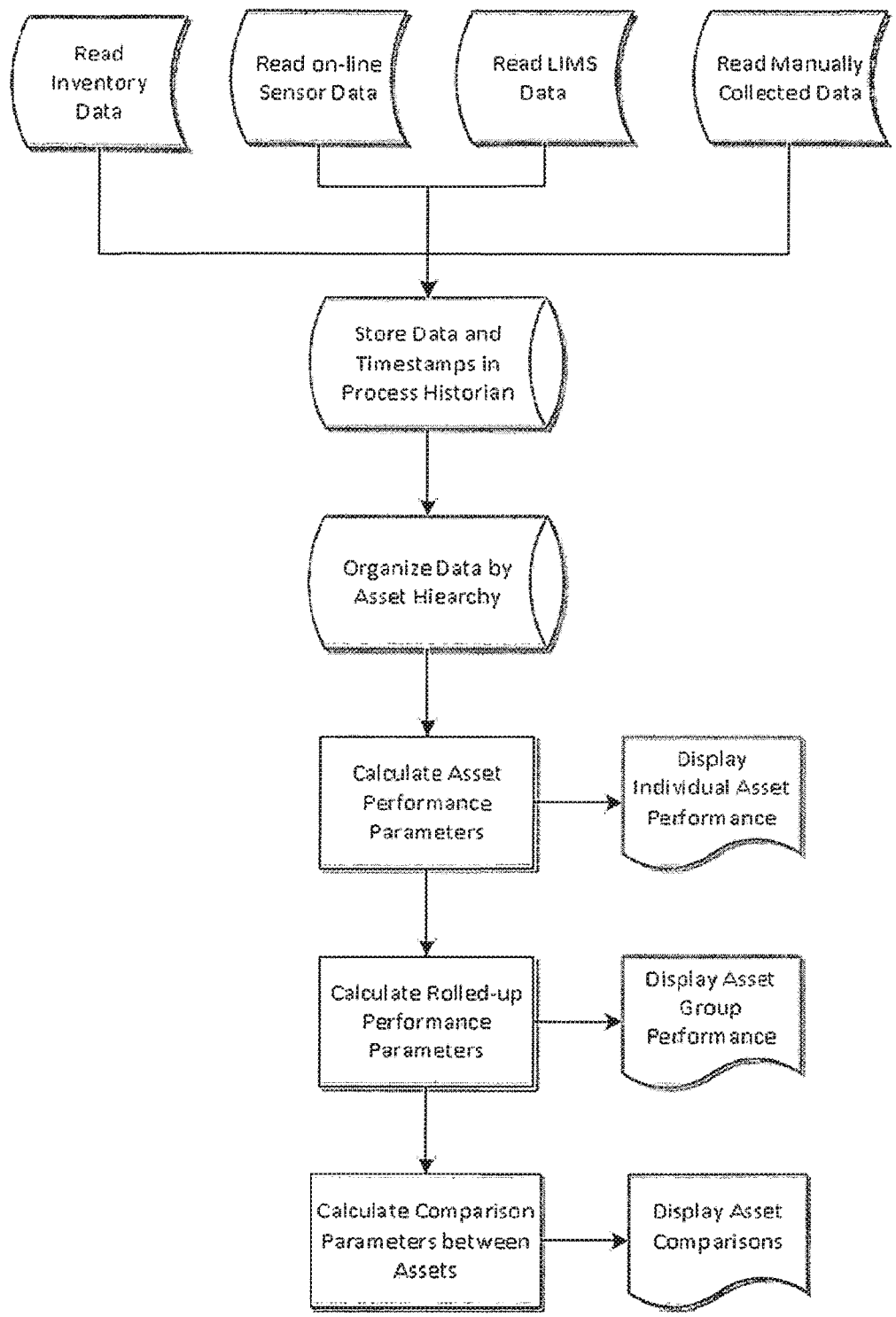
FIG. 1 is a flowchart illustrating at least one embodiment of the inventive method.

The collected data is various readings of various specifications (or specs) of relevance various assets. Collected specs include but are not limited to temperature, pressure, pH, voltage, density, viscosity, and concentration of one or more materials of interest. The specs are collected from various "assets" including but not limited to specific boilers, heat exchangers, cooling towers, conduit pipes, reaction vessels, mills, storage tanks, mixing tanks, pumps, valves, and the like, and any combination thereof. Each spec for each asset is recorded at a specific time. A data quantum containing a spec, an asset, and a time is referred to as raw data. Calculations a then performed on the raw data to rate it relative to known performance parameters of the particular asset. The parameters are acceptable measurements for given assets based on industry standards, determined best practice, or proprietary information. FIG. 1 illustrates at least one example of collecting specs for various assets.

The raw data is allocated to a template. For purposes of this application the definition of "template" is a commonly defined data structure for a given type of equipment in which the definition is such that it encompasses all examples of that equipment irrespective of such variables as location, construction, and customer, without having to modify the data structure.

In at least one embodiment the template corresponds to a client specific hierarchy. For purposes of this application the definition of "hierarchy" is the sequential relationship from a smaller or more local unit of organization (such as a single asset) to increasingly larger units of organization (such as all of a particular asset of a large corporation or government, or all facilities of an industry in a continent). Templates can be organized within data structures such as arrays, queues, link lists, object-oriented programming structures, or any other form suitable for of data organization. In at least one embodiment, the hierarchy comprises various units measuring time-specs within assets, assets within areas, and areas within industries. The template contains at least one hierarchy defining data item (such as a single asset or a category of assets) and at least one spec for that item (such as pH in that asset). Templates and assets can also be limited to only those pieces of equipment designated for particular tasks or involved in producing particular products.

For example, a corporation having multiple oil refineries in various locations could have a low in the hierarchy template corresponding to one or more specs for a single distillation column in one particular refinery. It could also have various intermediate in the hierarchy templates referring one or more specs for some or all of the distillation columns in its various facilities. It could have a highest-level the hierarchy template referring to one or more specs for every distillation column (or even every asset) in all of its facilities. The templates can be organized at least according to: asset type, location, problem the asset(s) addresses, problem the asset(s) face, and time.

In at least one embodiment a score is provided to one or more of the various specs of a template. The score can be a determination if one or more specs of the template are within an acceptable margin or not, and if not by how large the deviation is.

In at least one embodiment a user can obtain useful knowledge by "rolling" up or down the hierarchy. When rolling, a user selects one or more specs and then observes templates that are higher or lower in the hierarchy and compares the changes in spec(s) between the templates. The specs for higher-in-the-hierarchy templates are aggregate values of the individual assets within that template's definition. This method allows a user to determine if one particular asset is exceptionally over or under performing relative to the user's business organization as a whole. This method is also useful in observing and predicting organization wide trends and can be used to initiate pre-emptive or other countermeasures.

Figure 2:
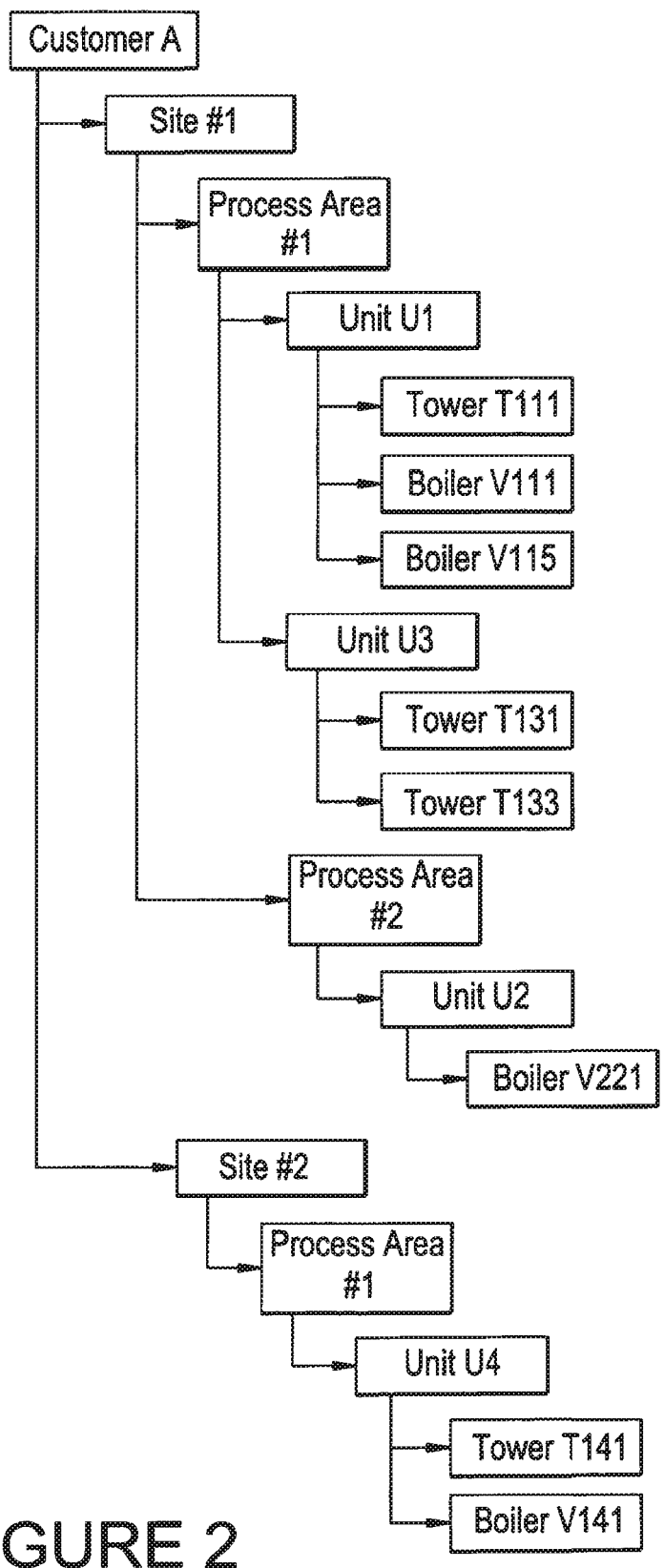
FIG. 2 is a diagram of hierarchy logic in at least one embodiment of the inventive method.

FIG. 2 illustrates a possible hierarchy for a user. The Customer template includes specs for all the user's Sites. Each Site in turn contains specs for that Site's Process Areas. The Process Areas contain specs for particular Units. The Units contain specs for the various pieces of equipment for that unit such as Boilers or Cooling Towers. Rolling up and down this hierarchy allows the user to modulate between useful global views and technically specific local views.

In at least one embodiment a user can obtain useful knowledge by observing one or more composite specs. A composite spec is a weighted valuation of multiple specs, which may or may not be directly related (such as for example scale deposit, leakage, and pH). Composite specs are useful for determining if an overall maintenance or reliability problem exists or if quality standards as a whole are being observed. High hierarchy composite specs can provide insights into company wide quality success or failures and can be used over time to gauge organization wide changes in quality.

In at least one embodiment process control equipment is constructed and arranged to respond to a message indicating a low scoring specs in one or more assets by initiating a countermeasure. The response can be automated, a manually enacted human response, or any combination thereof. In at least one embodiment the process control equipment includes chemical feeding and mixing apparatus such as those described in U.S. Pat. No. 7,550,060.

In at least one embodiment the invention utilizes the benchmarking methods and algorithms disclosed in U.S. Pat. No. 7,233,910 and/or US published patent application 2008/0201181 A1. In at least one embodiment target variables, first principle characteristics, usable characteristics are all determined and organized for the asset level and at various higher and lower hierarchical levels. Furthermore analysis models, developed characteristics, constraints, and equivalency factors are made to glean information at various different hierarchical levels.

In at least one embodiment a data display or "dashboard" utilizes the collected to information to display the various costs and benefits of alternative uses of assets and templates. For example, the system can collect and display the current degree of corrosion in one or more assets. It can utilize information to extrapolate the rate and effects of further corrosion, in particular the inefficiencies the corrosion causes, the costs of corrosion mitigating chemicals, and the reduction in quality of resulting product. The system can also obtain information regarding cost of repairs and replacements at the present time or at one or more future times loss due to repairs. The system can compare that information with data regarding the profit that can be generated from producing a particular product with one or more of the assets. The display would them show a user the real time actual cost of deferring repairs versus the benefits of continuing production and allow the user to make up to date actual business decisions using information at the asset level.

In at least one embodiment a production "sweet spot" can be determined. In general more profit can be obtained by continually producing a valuable product. At the same time however, if one or more of the production assets are impaired (for example by corrosion issues), more costs are also incurred because ever greater amounts of remediation strategies (such as corrosion compensating chemicals) must be applied, the system must be taken offline longer to effect more comprehensive repairs, and/or one or more components of the system may become irreparably damaged and must ultimately be replaced. This can vary by product because different products impose different degrees impairment on their production facilities.

The sweet spot is the degree of production just before a point of diminishing return exists where even highly profitable products display shrinking profit margins due to compounded impairment costs. For example it might be profitable to run production for a particular product until just before a key component fails because the cost of corrosion-remediation chemicals is outweighed by the product's market value but the market value does not outweigh the cost of replacing that component. In at least one embodiment the data is used to assure that production is run up until a particular reduction in profit is about to manifest and no further.

This ability to correlate the factors needed to make rational business decisions allows the user to recognize the opportunity costs of various decisions. For example if doubling is or tripling production would double or triple revenues but would only increase corrosion costs by a lesser amount, increasing production makes sense. If however corrosion remediation costs increase at a rate greater than the increase in revenues of increased production, but corrosion costs decrease by an even greater amount by decreasing production, continuing production at a reduced rate makes sense. By allowing the user to see in real time the true costs of various production options and the financial consequences of those options, useful decisions can be made. In at least one embodiment the costs of corrosion remediation includes at least in part the costs of using the methods and compositions disclosed in U.S. Pat. Nos. 5,326,482 and 5,252,524.

In at least one embodiment the cost of continuing production includes but is not limited to the cost of scale reducing chemicals used, the cost of scale removal, and the energy cost due to reduced efficiency in the asset. These costs themselves can vary by asset due to the utility (water, electricity, gas, waste disposal), labor, raw material, transportation, and climate based costs due to the specific location of an asset. These costs can also vary by asset based on age of an asset or the particular technology used by that asset. In at least cane embodiment the asset-by-asset analysis of cost versus benefit is displayed or generated in a data format and determines which assets should continue production, which should increase and which should decrease and/or cease production. In at least one embodiment the data is used to determine opportunity costs of various production options for crude oil refinery units.

In at least one embodiment the system is constructed and arranged to determine the opportunity costs of various options of operating industrial boilers. Boilers operate under various constraints. At low cycle levels large amounts of feedwater are used and wear and tear on the system is reduced but feedwater costs increase. At high cycle levels, as the same water is cycled again and again through the system, less feedwater is used but the water in the system becomes increasingly harsh and scale or corrosion is more likely to result and scale or corrosion chemicals must be used. Furthermore the temperature that the water is maintained at determines which of either corrosion or scale build up is more likely to occur. The particular temperature at which either scale or corrosion occurs however is unique for each asset. Furthermore temperature changes also involve different energy costs. In at least one embodiment the system is constructed and arranged to determine what the cost of feedwater is, the cost of scale control, and the cost of corrosion remediation and to display such information. In at least one embodiment the user adjusts the cycle level and boiler temperature to utilize the lowest possible cost combination of feedwater, scale control chemicals, and corrosion control chemicals.

In at least one embodiment the system is constructed and arranged to determine the opportunity costs of various options of operating cooling towers. Similar to boilers, cooling towers have the constraints of controlling for feedwater cycle costs and corrosion and scale costs. In addition cooling towers utilize fill packing to increase the surface area of the water to better cool it. Fill packing however over time becomes damaged and losses efficiency. To compensate fans must blow longer to achieve equal amounts of cooling thereby greater energy costs are incurred. In at least one embodiment the system is constructed and arranged to keep track of the fill packing efficiency and to use that information to compute the energy costs of fan use. The system then displays the various costs of changing feedwater cycles, corrosion remediation rates, scale remediation rates, and fan energy use to determine the opportunity costs of various settings for the cooling tower. The system can also display the cost differential for continuing to operate the cooling tower as-is or to take the tower offline and replace damaged fill packing.

In at least one embodiment the system is constructed and arranged to determine the opportunity costs of various options of operating heat exchangers. With heat exchangers typically a cost benefit decision needs to be made comparing the cost of taking an exchanger offline to re-tube or otherwise repair it or to operate it at a less efficient manner and thereby incur additional energy costs. In at least one embodiment the system displays the comparative opportunity costs of continuing to operate a heat exchanger versus re-tubing or otherwise repairing it.

In at least one embodiment the system is constructed and arranged to determine the opportunity costs of various options of operating a wastewater facility. Wastewater facilities often utilize various microorganisms to break down waste products in water and then discharge the water. Adding particularly hot liquids to the wastewater facility kills at least some of the microorganisms. As a result conflicting costs constrains involving how vital the microorganisms are (how large or healthy is the population of microorganisms and how much added heat can that population handle before it is impaired or even completely killed off), the cost of replacing the microorganisms, and the cost of storing and diverting water needing treatment until the water either cools enough or the microorganisms are vital enough to process the water. In at least one embodiment the system displays the costs of admitting various amounts of waster into a treatments facility and/or a diversionary storage facility.

In at least one embodiment the system is constructed and arranged to display the costs of operating one or more assets according to the methods and procedures in U.S. Pat. Nos. 7,448,230 and 6,957,153.

In at least one embodiment the system is constructed and arranged to display the opportunity costs and opportunity benefits of idling, operating (at one or more possible capacities producing one or more products), remediating, and/or repairing one or more or all of one or more kinds of assets within the hierarchy versus the opportunity costs. For purposes of this application "remediating" means adding chemicals to an asset specifically for the purpose of limiting, mitigating, or counteracting a phenomenon occurring during its operation which is harmful or damaging to some or all of one or more assets. Examples of remediation are scale control, corrosion control, acid neutralization, base neutralization, microbial control, microbial preservation, and any combination thereof. Products include but are not limited to chemicals, fuel, oil, petroleum, diesel fuel, hydrocarbon products, refined goods, manufactured goods, processed commodities, and any other industrial product subject to fluctuating prices in some market. Costs include but are not limited to solid, liquid or gas pollution costs and damages, carbon taxes, raw materials costs, utility costs, transportation costs, loss of time, loss of market share, labor costs, safety costs, and any combination thereof.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments described herein and incorporated herein.

The above disclosure is intended to be illustrative anal not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A computer-implemented method for remediating equipment damage within a chemical production process, the method comprising:
   a) measuring, by one or more data sources, operational data descriptive of a plurality of individual process control assets corresponding to the chemical production process, the one or more data sources including one or more of a control systems output, handheld equipment, a laboratory management system, a gauge, a transmitter, and an inventory management software;
   b) receiving, by a computer and from the one or more data sources, the operational data collected from and descriptive of the plurality of individual process control assets corresponding to the chemical production process;
   wherein each respective process control asset of the plurality of individual process control assets is a respective piece of equipment subject to a respective set of chemical conditions;
   wherein the plurality of individual process control assets include at least one of: a boiler, a heat exchanger, a cooling tower, a conduit pipe, a reaction vessel, a mill, a storage tank, a mixing tank, a pump, and a valve;
   wherein the operational data received from the one or more data sources and descriptive of a respective process control asset of the plurality of individual process control assets includes operational values for one or more of: temperature of the respective process control asset, pressure of the respective process control asset, pH of the respective process control asset, voltage of the respective process control asset, density of the respective process control asset, viscosity of the respective process control asset, and concentration of a particular composition of matter used by the respective process control asset; and
   wherein the operational data further includes information regarding at least one of: scale buildup, corrosion level, acidity level, base level, and microbial health;
   c) storing, for each process control asset of the plurality of individual process control assets, by the computer, the received operational data into a data structure of a template for the respective process control asset;
   wherein templates for the plurality of individual process control assets are organized into a hierarchy, the hierarchy including templates for single process control assets at a lowest level of the hierarchy and templates for categories of process control assets at a higher level of the hierarchy;
   wherein different templates at the lowest level of the hierarchy are defined for different types of equipment; and
   wherein the hierarchy is selected from a group comprising: an asset category, a geographic location, a unit of ownership, a time of operation, and a cost of operation;
   d) accumulating, by the computer, the one or more operational values in the operational data from each of the plurality of individual process control assets, the plurality of individual process control assets being within a category of process control assets for and associated with a template at the higher level of the hierarchy;
   e) calculating a composite operational value based on the one or more operational values;
   f) determining, by the computer, whether the composite operational value is within an acceptable range of values; and
   g) upon the composite operational value not being within the acceptable range of values, which indicates a damage to the process control asset, controlling, by the computer, a chemical feeding and mixing apparatus to initiate a remediating countermeasure, wherein the computer controls the chemical feeding and mixing apparatus to add a chemical to the process control asset, the chemical operable to perform on the process control asset at least one of: scale control, corrosion control, acid neutralization, base neutralization, microbial control, and microbial preservation.

2. The computer-implemented method of claim 1, wherein the chemical production process is an oil refinery.

3. The computer-implemented method of claim 2, wherein the plurality of individual process control assets include a plurality of distillation columns.

4. The computer-implemented method of claim 2, wherein a single process control asset at the lowest level of the hierarchy is a distillation column at one oil refinery and a category of process control assets at the higher level of the hierarchy includes multiple distillation columns at multiple oil refineries.

5. The computer-implemented method of claim 1, further comprising determining, by the computer, a score for a respective process control asset of the plurality of individual process control assets based on specification data collected from the respective process control asset.

6. The computer-implemented method of claim 1, further comprising:
   receiving, by the computer, operational data collected from the plurality of individual process control assets so as to provide collected operational data;
   inputting, by the computer, the collected operational data into a plurality of templates at the lowest level of the hierarchy;
   aggregating, by the computer, at least one operational value for a plurality of individual process control assets to determine an aggregate operational value, the plurality of individual process control assets being within a category of process control assets associated with the plurality of templates at the higher level of the hierarchy;
   displaying, by the computer, data associated with the plurality of individual process control assets in the hierarchy;
   receiving, from a user, a specification selection; and
   modulating a view of the displayed data according to the specification selection received from the user by displaying data associated with a different template at a different level of the hierarchy.

7. The computer-implemented method of claim 1, wherein receiving operational data comprises receiving operational data from a process historian.

\* \* \* \* \*